Dec. 17, 1957 W. H. BURKHART 2,816,757
PNEUMATICALLY CONTROLLED TAPE TRANSPORTER
Filed July 16, 1956
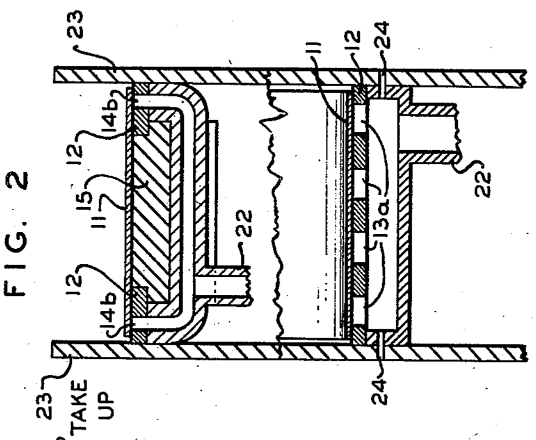
FIG. 2
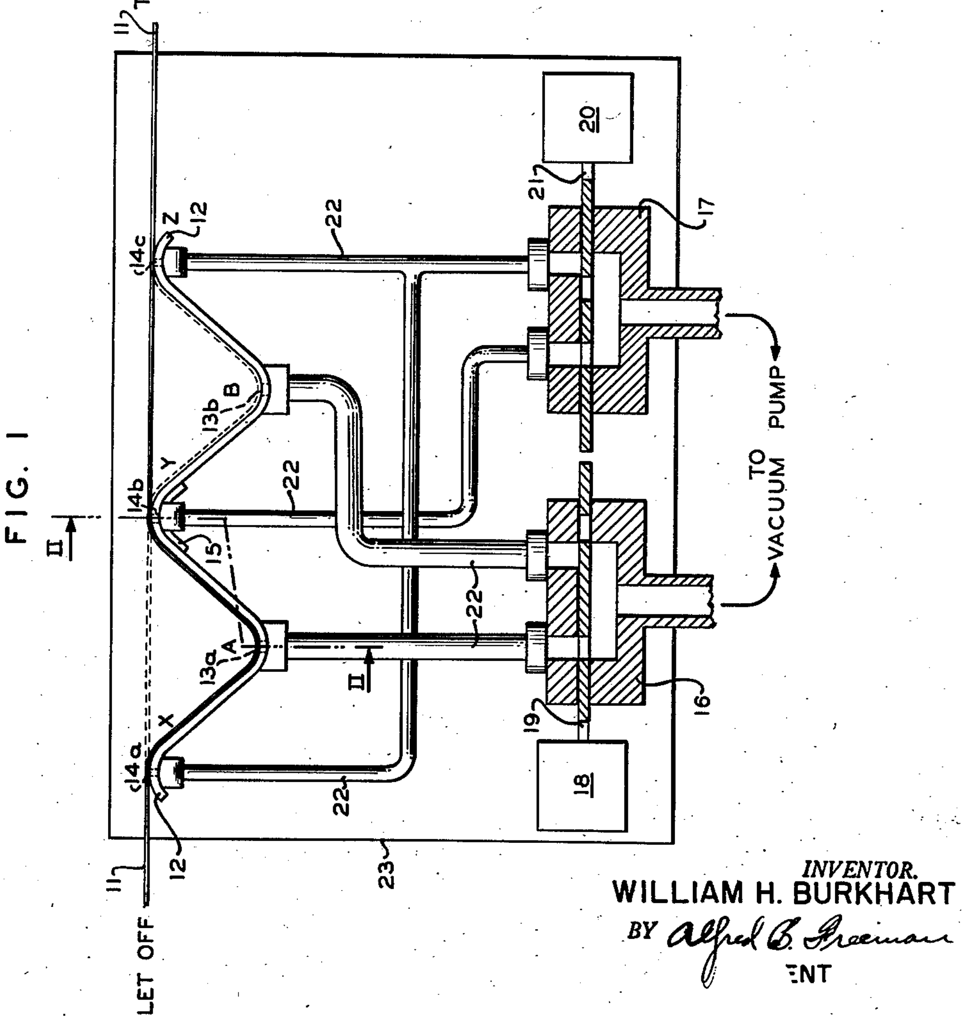
FIG. I
INVENTOR.
WILLIAM H. BURKHART
BY Alfred B. Freeman
ENT United States Patent Office 2,816,757

Patented Dec. 17, 1957

2,816,757

PNEUMATICALLY CONTROLLED TAPE TRANSPORTER

William H. Burkhart, West Orange, N. J., assignor to Monroe Calculating Machine Company, Orange, N. J., a corporation of Delaware Application July 16, 1956, Serial No. 597,953

18 Claims. (Cl. 271—2.1)

This invention relates to a pneumatically controlled means for moving tape past a data imposing or sensing means wherein the tape reaches the proper speed in a very short time after starting.

The transporter of this invention can advance the tape a step at a time as data is received for recording or as data playback is requested. It can also cycle a section of tape back and forth to permit the selective reading of bits of information an item at a time to control a slower operating device such as a printing means. The cycling feature can also be used for checking of data recorded or played back to insure accuracy.

The tape and the data imposing or sensing means can be of any type such as magnetic tape and magnetic recording or playback heads or punched tape and tape punches or perforation responsive means. The transporter can be controlled by data being received or by control signals from any type of other data handling equipment.

An object of the invention is a tape transporter which can move tape in a stepwise fashion for recording or reading in response to independent control means.

A further object of the invention is a tape transporter which can advance tape past a recording head a step at a time as data is received for recording.

A still further object of this invention is a tape transporter which can smoothly accelerate tape to the proper speed for reading or recording in a short time.

A yet further object of this invention is means for reading bits of information at a time in synchronism with a slower operating data handling device.

A further object still of this invention is a means for recording or reading data on short strips of tape that can be inserted by manual or other strip handling means.

Other objects and advantages and a fuller understanding of the invention will be had by referring to the following description and claims taken in conjunction with the accompanying drawings in which:

Fig. 1 is an elevation view taken laterally of a tape transporter embodying this invention with one side of the case removed and sections of the control valves cut away.

Fig. 2 is an elevation view taken along the line II—II of Fig. 1.

Referring now to Fig. 1 and Fig. 2, tape 11 runs over undulating member 12 from a tape supply source through a let-off means to a tape take-up means (both means not shown). Member 12 has vertically cut ports **13*a* and 13*b* at the bottom of valleys A and B, respectively, and vertically cut vents 14*a*, 14*b* and 14*c* at the peaks of hills X, Y and Z, respectively. Application of a vacuum, by means to be described later, to ports 13*a* or 13*b* will cause tape 11 to be pulled into the respective valley A or B. Application of a vacuum to vent 14*a*, 14*b* or 14*c* will hold tape 11** at the respective peak of hill X, Y or Z.

Application of a vacuum to port **13*a* and vent 14*b* will pull tape 11 into valley A from the let-off means as it is held at hill Y. With no vacuum applied to port 13*b* and vent 14*c*, take-up means will pull tape 11 from valley B. Tape 11 will then be in the position shown in Fig. 1. The following application of a vacuum to port 13*b* and vents 14*a* and 14*c*, with removal of the vacuum from port 13*a* and vent 14*b*, will pull tape 11 from valley A to valley B. A section of tape 11, equal in length to the difference between the tangential distance and the valley contour distance between hill X and hill Y, will then be moved past data element 15 which is located at the peak of hill Y. Data element 15 may be any type of tape recording or playback device for recording or reading data on tape 11**.

Valves 16 and 17 are connected to a vacuum pump (not shown) or a similar suitable vacuum producing source. Actuator 18 moves slotted plate 19 in valve 16 between two positions to switch application of a vacuum between ports **13*a* and 13*b*. Actuator 20 likewise positions plate 21 in valve 17 to switch application of a vacuum between vent 14*b* and vents 14*a* and 14*c*. Fluid communicating members 22 provide the necessary passages between valves 16 and 17 and the respective ports 13*a* and 13*b* and vents 14*a*, 14*b* and 14*c*. Hollows in plates 19 and 21 permit the passage of air from the outside through passageways in the body portions of valves 16 and 17 to the members 22 not connected to the vacuum so that previously applied vacuums in members 22** are quickly dissipated when a change is made.

If actuators 18 and 20 push and pull their respective plates 19 and 21 in synchronization, vacuums will be applied to port **13*a* and vent 14*b* and to port 13*b* and vents 14*a* and 14*c* alternately. Tape 11 will then be moved to the right a step each time the cycle is repeated. If actuator 18 pulls while actuator 20 pushes and vice versa, vacuums will be applied to port 13*a* and vents 14*a* and 14*c* and to port 13*b* and vent 14*b* alternately. Tape 11 will then be moved to the left if functions of the let-off and take-up means are interchangeable. If actuator 18 cycles plate 19 while a vacuum is applied to vents 14*a* and 14*c* by valve 17, a section of tape 11** will be cycled between valleys A and B.

Actuators 18 and 20 can be connected to any suitable data control means to move tape 11 in the manner desired. For example, each item of incoming data to be recorded might result in the operation of a relay to initiate a cycle of actuators 18 and 20. Where recorded information is being played back, the output of data element 15 could be used to control actuators 18 and 20 to stop the pulling of tape 11 into valley B as soon as a given bit or amount of information had been played back.

If the applied vacuum is relatively constant while tape 11 is being pulled into valley A or B, the force will be greater initially due to the larger area of tape 11 over which the pressure difference exists. The force will decrease as tape 11 moves down into valley A or B and the effective area decreases. This provides a large force to overcome inertia and accelerate tape 11 and a reduced force after it is moving. The force pattern will depend on the contour of member 12 which can be varied to match the characteristics of different let-off devices for attainment of a more nearly constant speed of tape 11.

As shown in Fig. 2, plates 23 provide support for the various components and form the walls of a chamber on each side of valleys A and B. Vents 24 in walls 23 and members 22 connected to ports **13*a* and 13*b* permits air to continue to flow to valve 16 after tape 11 has been pulled against ports 13*a* or 13*b*. This limits the build up of the vacuum applied to ports 13*a* and 13*b* to prevent damage to tape 11. Vents 14*a*, 14*b* and 14*c* are considerably smaller than ports 13*a* and 13*b* and a higher vacuum can be applied to them than to ports 13*a* and 13*b* without damaging tape 11**.

The functions of valves 16 and 17 can be performed by a single valve if tape 11 is to be moved only in one direction. Plates 19 and 21 would then be one member having ports arranged to apply the vacuum to port **13*a* and vent 14*b* in one position and to port 13*b* and vents 14*a* and 14*c*** in the other position. Only one actuator would be required to move this member between its two positions.

For most applications, the let-up and take-off means can be of any suitable type such as reels coupled to resilient means to apply tension to tape 11 at both input and output sides of member 12. The inertia of these means, however, must be small so that tape 11 can be pulled into valley A and out of valley B between successive recording or playback steps. Where each section of tape is to be cycled back and forth a number of times and a minimum delay between the reading of successive sections is desired, an additional hill and valley can be added to each end of undulating member 12 to provide an input and output buffer. Tape 11 could then be transferred to and from these additional valleys while a section was being cycled a number of times between valleys A and B. When multiple cycling of one section is completed, the valley on the input side would then be holding another section of tape 11 which could be transferred rapidly to valley A. At the same time, the old section in valley B could be transferred to the other added valley which would then release it to the take-up means while the new section was being cycled between valleys A and B.

Short segments of tape can be individually inserted in the device for recording or reading. The ends of the segment would be held at hills X and Z and valve 16 could then be cycled to move a section back and forth over data element 15 between valleys A and B. The segment could be inserted and held by manual means if desired.

The cycling of valve 16 to move a section of tape 11 back and forth between valleys A and B and the reading or recording of an item of data with each cycle can be controlled by other data handling means. For example, a slow operating device such as a card printing or punching mechanism could initiate each cycle of valve 16 when it was ready for an item of information. A master track on tape 11 would advance a counter as each item of information passes data element 15. The counter would be precessed one count with each cycle and would gate out a different item of information to the mechanism on each cycle.

Instead of a vacuum, a pressure might be used by providing suitable openings above tape 11. Pressure applied to an opening above a hill X, Y or Z would force tape 11 against member 12 at that point to hold it stationary as before. Pressure applied to an opening above valley A or B would likewise force tape 11 into the valley A or B. Application of pressure to the openings would be controlled in the same manner as was the application of a vacuum to ports **13*a* and 13*b* and vents 14*a*, 14*b* and 14*c***.

Although the invention has been described with a certain degree of particularity, it is understood that the present disclosure has been made only by way of example and that numerous changes in the details of construction and the combination and arrangements of parts may be resorted to without departing from the spirit and scope of the invention as hereinafter claimed.

What is claimed is:

1. A tape handling device comprising an undulate surface, a chamber having ports intimate with the hills and valleys of said surface, means for maintaining a difference in pressure between the inside and outside of said chamber and means for closing said ports selectively.

2. The combination according to claim 1 wherein said surface has holes at its hills and valleys, said holes being coextensive with said ports.

3. The combination according to claim 1 wherein said port closing means operates alternately on selected combinations of said ports.

4. The combination according to claim 3 wherein said selected combinations of said ports comprise ports intimate with alternate hills and their immediately preceding valleys.

5. The combination according to claim 1 wherein said closing means comprises a valve.

6. The combination according to claim 1 wherein said closing means comprises a plurality of valves.

7. A tape handling device comprising an undulate surface having two valleys, a chamber having two ports individually intimate with the valleys of said surface, means for maintaining a difference in pressure between the inside and outside of said chamber, and means for closing said ports alternately.

8. The combination according to claim 7 wherein the valleys of said surface have holes coextensive with said ports.

9. A tape handling device comprising an undulate surface having ports located at two valleys, a source of vacuum, and means for connecting said source alternately to said ports.

10. A tape handling device comprising an undulate surface having ports located at its hills and valleys, a source of vacuum, and means for connecting said source to said ports selectively.

11. A tape handling device comprising an undulate surface having ports located at its hills and valleys, a source of vacuum, and means for connecting said source alternately to selected combinations of said ports.

12. The combination according to claim 11 wherein said selected combinations comprise the ports at alternate hills and their immediately preceding valleys.

13. A tape handling device comprising a pair of substantially parallel walls, a member located between said walls having its edges joined thereto, said member having an undulate surface with ports located at its hills and valleys, a source of vacuum, and means for connecting said source to said ports selectively.

14. The combination according to claim 13 wherein said connecting means comprises a plurality of valves.

15. The combination according to claim 13 wherein said connecting means connects said source alternately to selected combinations of said ports.

16. The combination according to claim 15 wherein said connecting means comprises a valve.

17. The combination according to claim 15 wherein said selected combinations comprises the ports located at alternate hills and their immediately preceding valleys.

18. A tape handling device comprising a pair of substantially parallel walls, a member located between said walls having its edges joined thereto, said member having an undulate surface with ports located at two valleys, and a valve operable to connect said source to said ports alternately.

No references cited.